(No Model.)

R. J. SMITH.
CHAIN WHEEL.

No. 388,317. Patented Aug. 21, 1888.

ATTEST.
J. Henry Kaiser
Victor J. Evans.

INVENTOR.
Ralph John Smith,
By J. L. Zeube
Attorney.

United States Patent Office.

RALPH JOHN SMITH, OF SUNDERLAND, COUNTY OF DURHAM, ENGLAND.

CHAIN-WHEEL.

SPECIFICATION forming part of Letters Patent No. 388,317, dated August 21, 1888.

Application filed February 15, 1887. Renewed January 9, 1888. Serial No. 260,224. (No model.) Patented in England February 29, 1884, No. 4,161.

*To all whom it may concern:*

Be it known that I, RALPH JOHN SMITH, of Sunderland, in the county of Durham, England, have invented a new and useful Improvement in Chain-Wheels, which improvement is fully set forth in the following specification and accompanying drawings.

This invention relates to certain details connected with chain-wheels such as are used for working ship's cables, and for driving windlasses, and sometimes called "messenger" chain-wheels; also, in differential pulley-blocks or any wheel that grips the chain on the outside.

According to my invention the gripping parts or teeth are made in series semicircular in shape and securely fixed to the inner edges of the wheels, all as will now be more fully described and explained, reference being had to the accompanying drawings.

Figure 1:
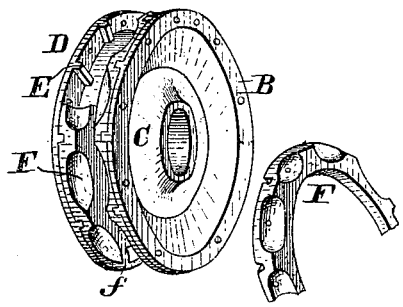
Figure 2:
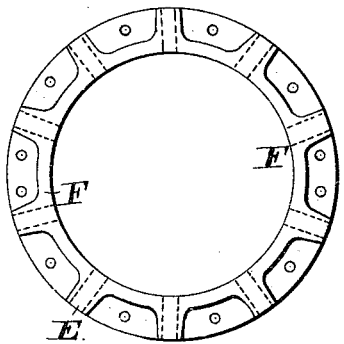
Figure 3:
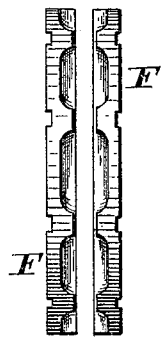

In the drawings, Figure 1 denotes the present device in perspective, and also a segment of the toothed part detached. Fig. 2 is a side elevation, and Fig. 3 an edge view.

A and B denote the disks, secured in the usual way to the central and internal boss or hub, C. Around the edge on the inner face of each disk are the radial ribs E, which are adapted to fit into the grooves *f* of the semicircular toothed portion F. When thus placed in position, these semicircular pieces are secured in position by bolts passing through them and through the holes D in the edges of each disk. These toothed sections can be readily applied or detached, as may be desired or necessary, in making or using this device. There may be as many teeth or whelps along the periphery of the semicircular parts as may be desired.

Having described my invention, what I claim as new is—

In a chain-wheel, in combination with the disks A and B, having the radial ribs E E on their inner faces and united by the internal boss or hub, C, the whelps or bosses F, made in semicircular series and bolted in place, substantially as shown and described.

In testimony that I claim the foregoing I have hereunto set my hand, this 16th day of August, 1886, in the presence of witnesses.

RALPH JOHN SMITH.

Witnesses:
  ALFRED R. STOKOE,
    *Notary Public, Sunderland.*
  EBB. ADAMSON,
    *Clerk to Mr. A. R. Stokoe.*